(12) United States Patent
Chuang

(10) Patent No.: US 7,711,111 B2
(45) Date of Patent: May 4, 2010

(54) ASSEMBLING STRUCTURE OF BACK COVER FOR MOBILE PHONE

(75) Inventor: Chih-Hung Chuang, Taipei (TW)

(73) Assignee: Asustek Computer Inc., Peitou, Taipei (TW)

( * ) Notice: Subject to any disclaimer, the term of this patent is extended or adjusted under 35 U.S.C. 154(b) by 384 days.

(21) Appl. No.: 11/859,994

(22) Filed: Sep. 24, 2007

(65) Prior Publication Data

US 2008/0084994 A1   Apr. 10, 2008

(30) Foreign Application Priority Data

Oct. 5, 2006   (TW) ............................... 95137226 A

(51) Int. Cl.
  *H04M 1/00*   (2006.01)
  *H04M 9/00*   (2006.01)
(52) U.S. Cl. ................ 379/433.11; 379/419; 455/575.1
(58) Field of Classification Search ................. 379/419, 379/428.01, 433.08, 433.11; 455/575.1, 455/90.3; 292/141
See application file for complete search history.

(56) References Cited

U.S. PATENT DOCUMENTS

| | | |
|---|---|---|
| 6,312,274 B1 | 11/2001 | Lin |
| 2002/0131584 A1 | 9/2002 | Mote et al. |
| 2004/0012209 A1 | 1/2004 | Liu et al. |
| 2006/0115715 A1 | 6/2006 | Ge et al. |
| 2006/0172590 A1 | 8/2006 | Yamada et al. |

*Primary Examiner*—Tuan D Nguyen
(74) *Attorney, Agent, or Firm*—Thomas, Kayden, Horstemeyer & Risley

(57) ABSTRACT

A mobile phone at least includes a first back cover, a second back cover and a main body. The first back cover has a first fastening part on its inner wall. The second back cover has a first interfering part on its inner wall. The first back cover and the second back cover are assembled with the main body. The main body has a resilient hook including a resilient arm, a second fastening part and a second interfering part. One end of the resilient arm is fixed to the main body, and the second fastening part is provided on the other end of the resilient arm. The second interfering part is provided on the resilient arm. When the second back cover is separated from the main body, the first interfering part pushes against the second interfering part to drive the second fastening part to separate from the first fastening part.

11 Claims, 5 Drawing Sheets

ASSEMBLING STRUCTURE OF BACK COVER FOR MOBILE PHONE

BACKGROUND OF THE INVENTION

RELATED APPLICATIONS

This application claims priority to Taiwan Application Serial Number 95137226, filed Oct. 5, 2006, which is herein incorporated by reference.

1. Field of the Invention

The invention relates to a mobile phone and, more particularly, to an assembling structure of covers for a mobile phone.

2. Description of the Related Art

Conventionally, the back of a mobile phone (the face without a screen) usually has covers for a user to disassemble to replace a battery or covers with different colors. Most of the conventional back covers include antenna covers and battery covers.

A disassembling method of a battery cover should be convenient to a user, while an antenna cover is usually fixed to the main body of a mobile phone since it does not designed to be directly disassembled by the user. However, the fixed antenna cover also makes inconvenience for a serviceman, so that it is inconvenient for the service. Especially, when an serviceman disassembles the antenna cover to test the mobile phone, he may damage the antenna cover thus to affect the appearance or cause a requirement of changing back covers.

BRIEF SUMMARY OF THE INVENTION

Therefore, an objective of the invention is to provide an assembling structure of back covers for a mobile phone which is convenient to be assembled and disassembled.

According to the above objective, a mobile phone is provided. The mobile phone at least includes a first back cover, a second back cover and a main body. The first back cover has a first fastening part on its inner wall, and the second back cover has a first interfering part on its inner wall. The first back cover and the second back cover are assembled with the main body. The main body has a resilient hook including a resilient arm, a second fastening part and a second interfering part. One end of the resilient arm is fixed to the main body, and the second fastening part is provided at the other end of the resilient arm. The second interfering part is provided at the resilient arm. When the first back cover and the second back cover are assembled with the main body, the first fastening part is fastened with the second fastening part to fix the first back cover. When the second back cover is separated from the main body, the first interfering part pushes against the second interfering part to drive the second fastening part to separate from the first fastening part by the resilient arm, so that the first back cover can separate from the main body.

In an embodiment of the invention, the first fastening part may be a recess, and the second fastening part may be a hook part.

In an embodiment of the invention, the first interfering part and the second interfering part may be circular arc protrusions.

These and other features, aspects, and advantages of the present invention will become better understood with regard to the following description, appended claims, and accompanying drawings.

DETAILED DESCRIPTION OF THE EMBODIMENTS

As described above, the invention provides an assembling structure of covers for a mobile phone, which is suitable for a mobile phone with two covers. The following embodiments provide details of the invention.

Figure 1:
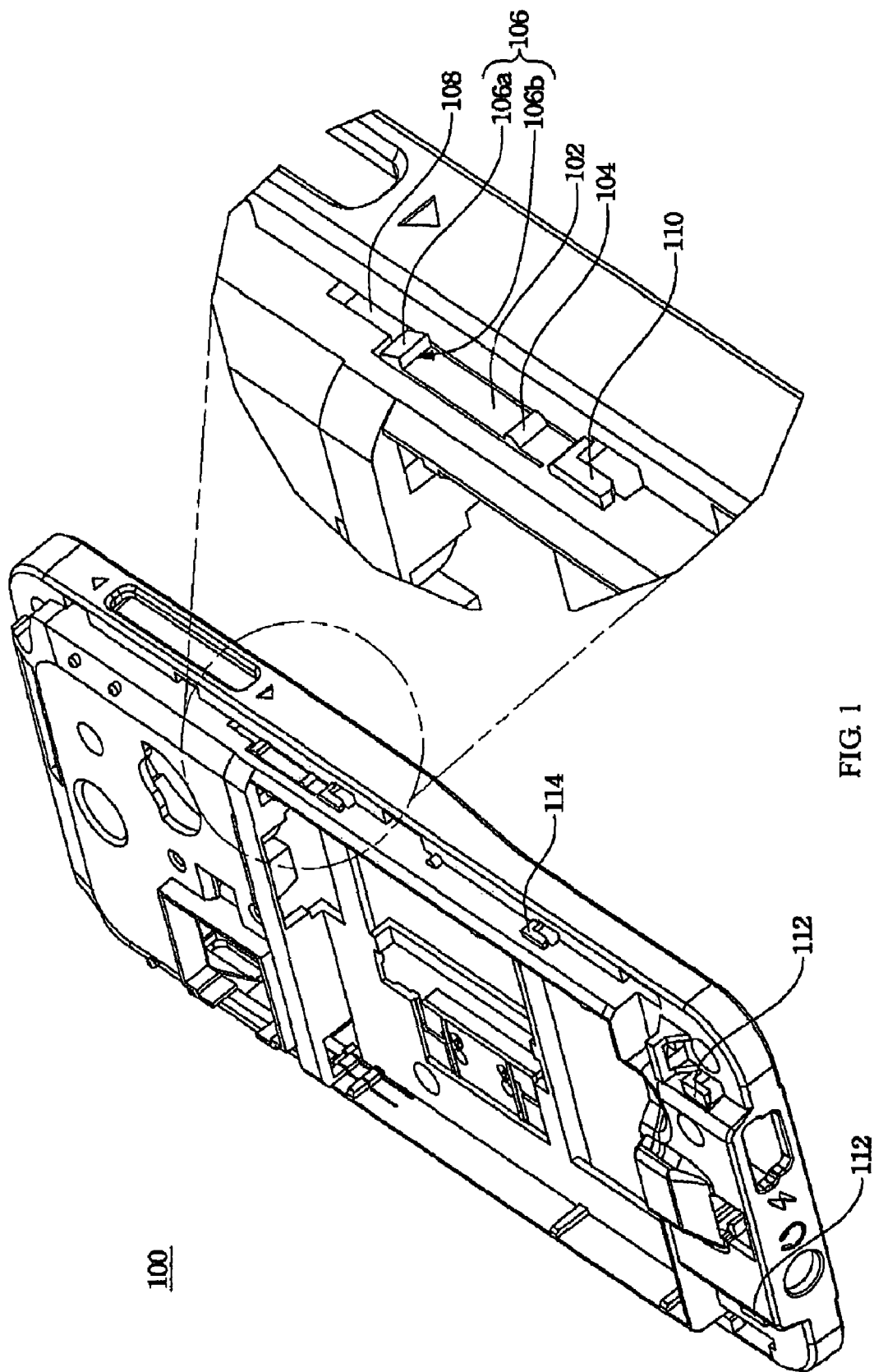
FIG. 1 is a structural diagram showing a main body of a mobile phone according to an embodiment of the invention.

FIG. 1 is a structural diagram showing a main body of a mobile phone according to an embodiment of the invention. FIG. 1 shows the main body 100 without being assembled with back covers and an enlarged view of an assembling structure. The assembling structure includes a resilient hook and assembling hooks 110, 112 and 114. The resilient hook includes a resilient arm 102, wherein one end of the resilient arm 102 is fixed to the main body 100 to support the other end (a free end 106). The free end 106 includes an inclined surface 106a and a fastening part (such as a hook part 106b), and the inclined surface 106a is connected with the hook part 106b. Further, an interfering part (such as a circular arc protrusion 104) is provided on the resilient arm 102. This figure shows only one of a pair of resilient hooks.

Figure 2:
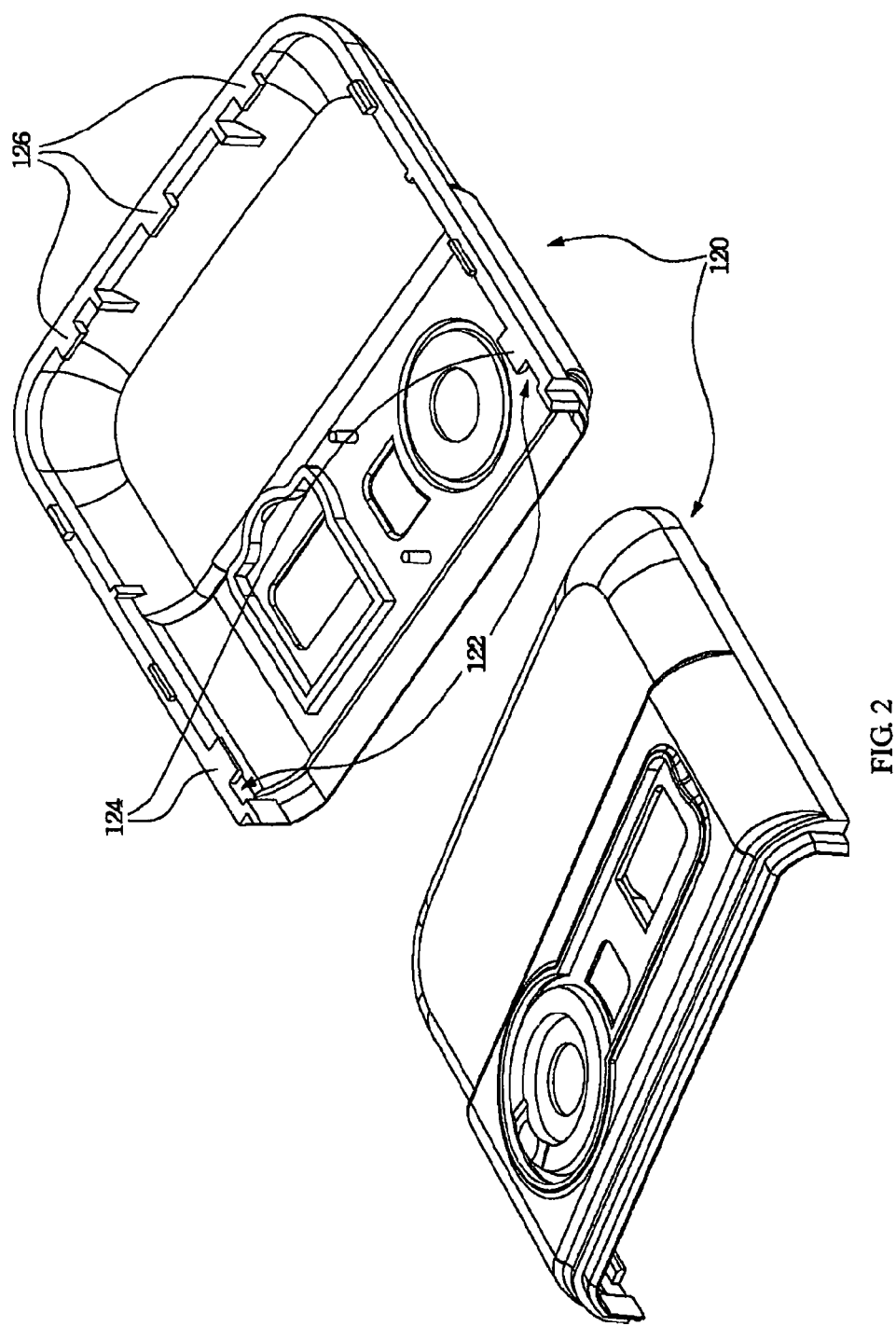
FIG. 2 is a structural diagram showing an antenna cover of a mobile phone according to an embodiment of the invention.

FIG. 2 is a structural diagram showing an antenna cover of a mobile phone according to an embodiment of the invention. FIG. 2 shows the inner wall (the upper right diagram) and the outer wall (the lower left diagram) of the antenna cover 120. A fastening part (such as a recess 122) on the inner wall of the antenna cover 120 corresponds to the fastening part (such as the hook part 106b) of the resilient hook in FIG. 1 when it is assembled. Further, the antenna cover 120 further includes a plurality of assembling hooks 124 and 126 for fastening with a plurality of recesses (such as a recess 108, and the other recesses are not shown in the figures) of the main body 100.

Figure 3:
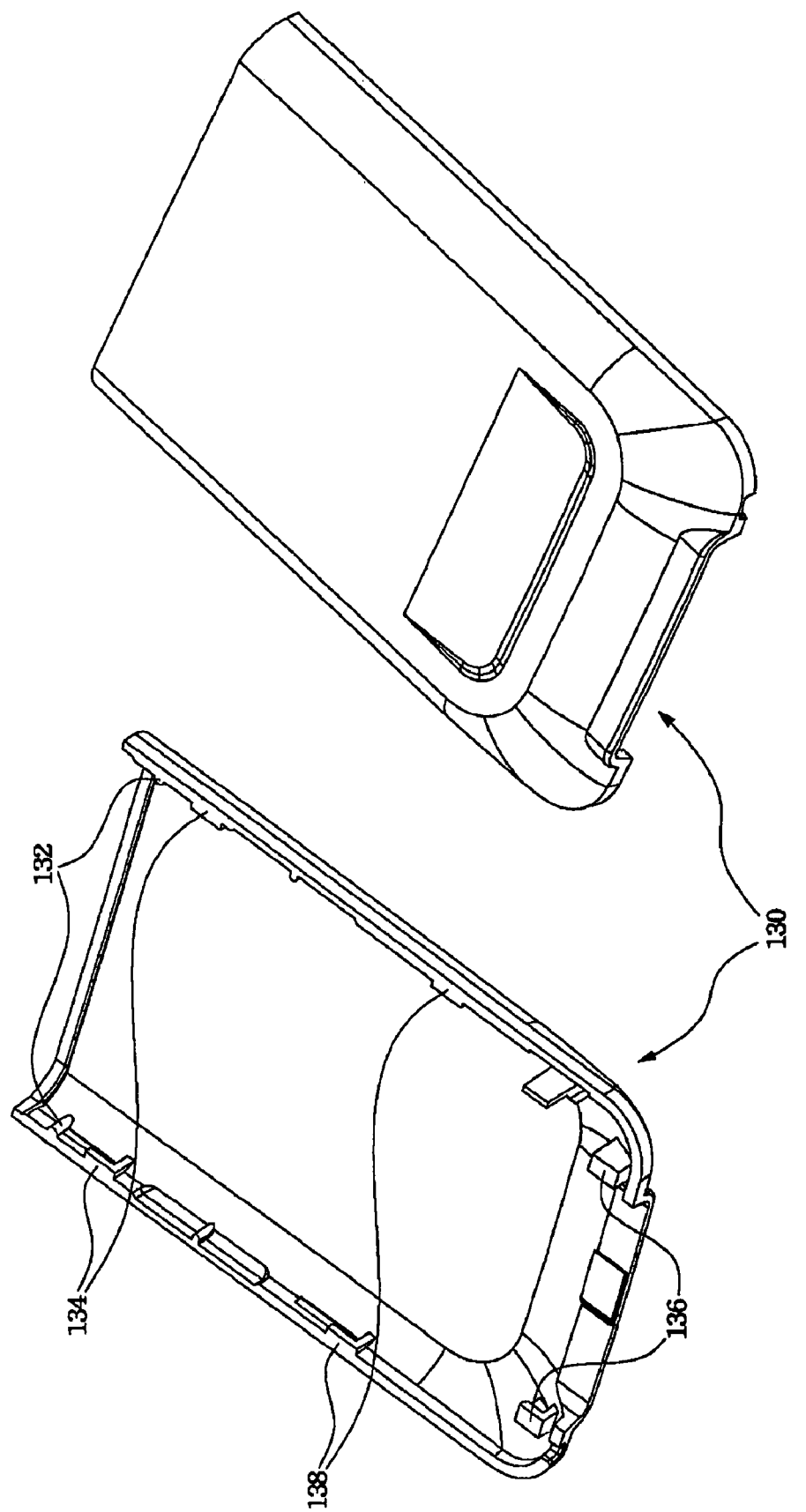
FIG. 3 is a structural diagram showing a battery cover of a mobile phone according to an embodiment of the invention.

FIG. 3 is a structural diagram showing a of a battery cover of a mobile phone according to an embodiment of the invention. FIG. 3 shows the inner wall (the upper left diagram) and the outer wall (the lower right diagram) of the battery cover 130. An interfering part (such as a circular arc protrusion 132) on the inner wall of the battery cover 130 corresponds to the interfering part (such as the circular arc protrusion 104) of the resilient hook in FIG. 1 when it is assembled. Furthermore, the battery cover 130 further includes a plurality of assembling hooks 134, 136 and 138 for fastening with the plurality of assembling hooks 110, 112 and 114 of the main body 100. For example, the assembling hook 134 is fastened with the assembling hook 110; the assembling hook 136 is fastened with the assembling hook 112; the assembling hook 138 is fastened with the assembling hook 114.

Figure 4:
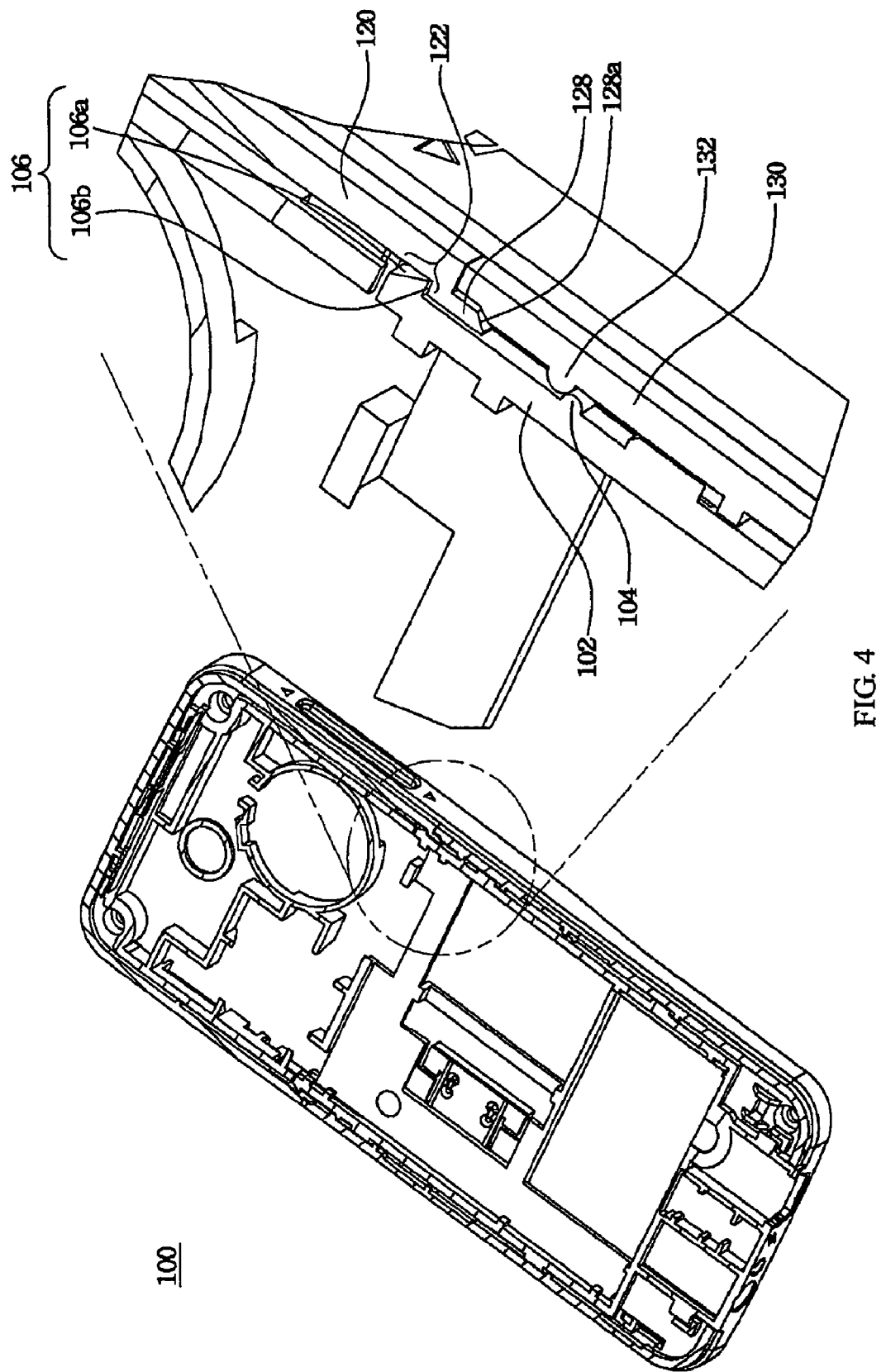
FIG. 4 is a section diagram showing a mobile phone after being assembled with an antenna cover and a battery cover according to an embodiment of the invention.

FIG. 4 is a section diagram showing a mobile phone after being assembled with an antenna cover and a battery cover according to an embodiment of the invention. Most parts of the antenna cover 120 and the battery cover 130 in FIG. 4 are removed in the section diagram, and only the parts assembled with the main body remain. When the antenna cover 120 and the battery cover 130 are assembled with the main body 100, elastic force of the resilient arm 102 makes the hook part 106b be fastened at the recess 122 to fix the antenna cover 120 and makes the circular arc protrusion 104 restrict the circular arc protrusion 132 to fix the battery cover 130, and the assembling end 128 of the antenna cover 120 is between the resilient arm 102 and the battery cover 130. The inclined surface 106a makes the hook part 106b easily slide into the recess 122. The assembling end 128 also has an inclined surface 128a for making the battery cover 130 easily slide to a predetermined position.

Figure 5:
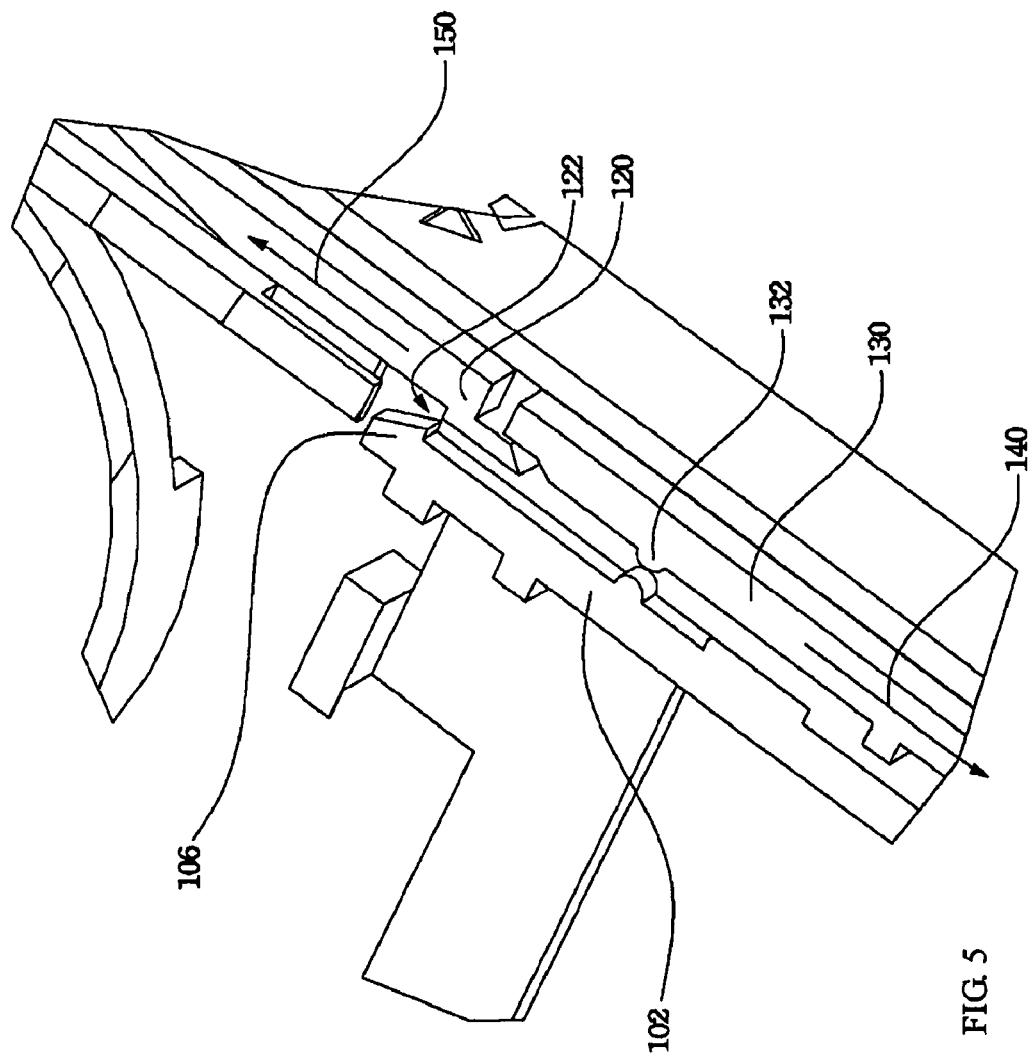
FIG. 5 is a section diagram showing a method for disassembling the antenna cover and the battery cover in FIG. 4.

FIG. 5 is a section diagram showing a method for disassembling the antenna cover and the battery cover in FIG. 4. When the antenna cover 120 and the battery cover 130 are to be assembled, the battery cover 130 is withdrawn along the direction 140 first. The circular arc protrusion 132 of the battery cover 130 pushes against the circular arc protrusion 104 to deform the resilient arm 102. When the top of the circular arc protrusion 132 contacts the top of the circular arc protrusion 104, the resilient arm 102 is deformed to the greatest degree and the hook part 106b is separated from the recess 122; thus the antenna cover 120 can be withdrawn only along a direction 150 at that moment.

From the above, the battery cover 130 can be easily disassembled to replace batteries by a user, while a skill is needed to disassemble the antenna cover 120. The objective of above design is not to enable the user to disassemble the antenna cover 120. However, for a serviceman, he can disassemble the antenna cover 120 only if he knows the skill.

Although the above embodiments takes the antenna cover 120 and the battery cover 130 for example, this assembling structure of covers also applies to other back covers for a mobile phone.

According to the above, the assembling structure of covers according to the invention can enable the antenna cover and the battery cover be disassembled easily only by a single resilient hook cooperating with other assembling hooks. Furthermore, the user only can easily disassemble the battery cover, while the serviceman knowing the disassembly skill can easily disassemble the antenna cover.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A mobile phone comprising:
   a first back cover having a first fastening part on its inner wall;
   a second back cover having a first interfering part on its inner wall; and
   a main body having a resilient hook for assembling the first back cover and the second back cover, wherein the resilient hook comprises:
   a resilient arm, wherein one end of the resilient arm is fixed to the main body;
   a second fastening part provided on the other end of the resilient arm; and
   a second interfering part provided on the resilient arm, wherein when the first back cover and the second back cover are assembled with main body, the first fastening part is fastened with the second fastening part to fix the first back cover, and when the second back cover is separated from the main body, the first interfering part pushes against the second interfering part to drive the second fastening part to separate from the first fastening part by the resilient arm, so that the first back cover separate from the main body.

2. The mobile phone according to claim 1, wherein the first back cover is an antenna cover.

3. The mobile phone according to claim 1, wherein the first back cover is a battery cover.

4. The mobile phone according to claim 1, wherein the first fastening part is a recess, and the second fastening part is a hook part.

5. The mobile phone according to claim 4, wherein the other end of the resilient arm further comprises an inclined surface connected with the hook part to make the hook part easily slide into the recess.

6. The mobile phone according to claim 1, wherein the first interfering part and the second interfering part are circular arc protrusions.

7. The mobile phone according to claim 1, wherein the first back cover further comprises an assembling end, and when the main body is assembled with the first back cover and the second back cover, the assembling end is between the resilient arm and the second back cover.

8. The mobile phone according to claim 7, wherein the assembling end comprises an inclined surface.

9. The mobile phone according to claim 1, wherein the main body further comprises a plurality of first assembling hooks.

10. The mobile phone according to claim 9, wherein the second back cover further comprises a plurality of second assembling hooks on its inner wall for being fastened with the first assembling hooks of the main body.

11. The mobile phone according to claim 1, wherein the first back cover further comprises a plurality of assembling hooks on its inner wall for being fastened with the main body.

* * * * *